Figure 1:
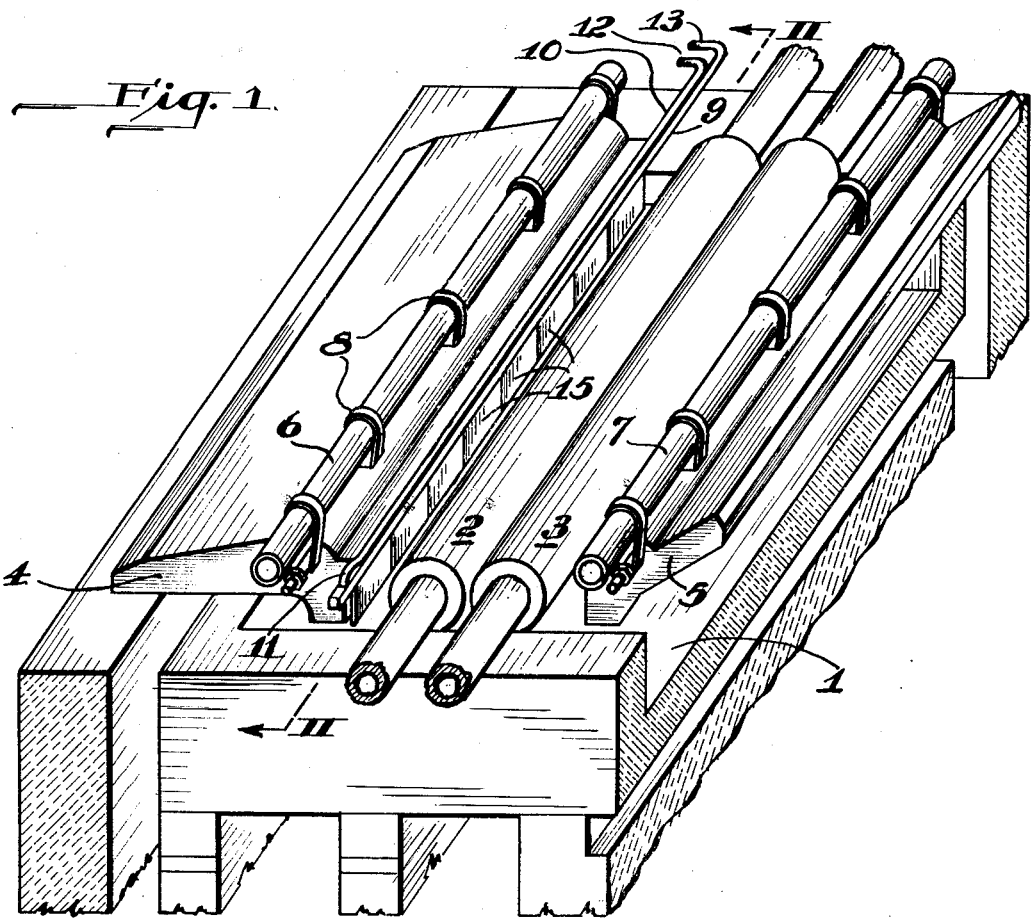

Aug. 15, 1933. W. G. KOUPAL 1,922,894
GLASS ROLLING APPARATUS
Filed Nov. 10, 1932 2 Sheets-Sheet 1

INVENTOR
Walter G. Koupal
by
Bradley & Bee
atty.

Aug. 15, 1933.  W. G KOUPAL  1,922,894
GLASS ROLLING APPARATUS
Filed Nov. 10, 1932  2 Sheets-Sheet 2
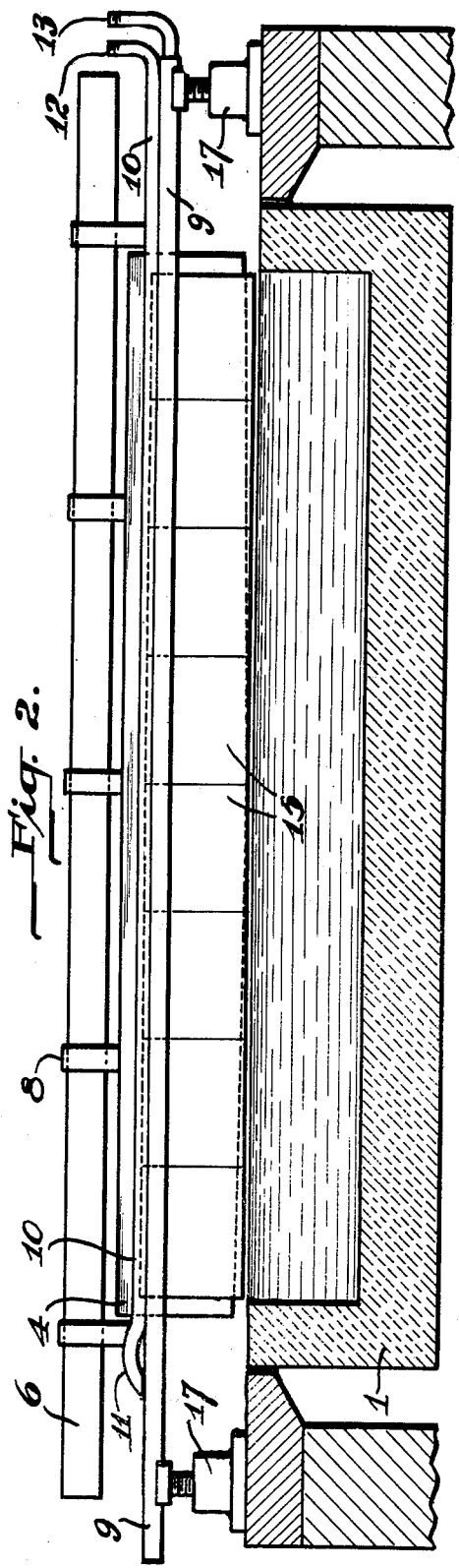
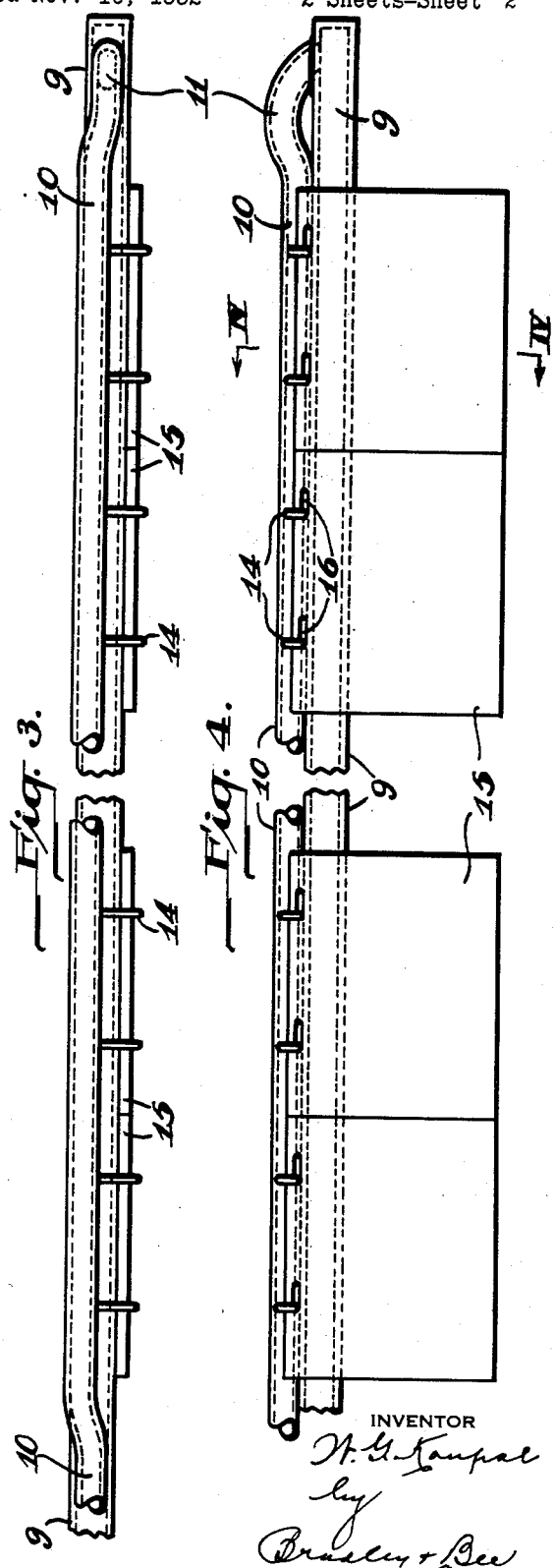
INVENTOR
W. G. Koupal
by
Bradley & Bee
attys Patented Aug. 15, 1933

1,922,894

UNITED STATES PATENT OFFICE 1,922,894

GLASS ROLLING APPARATUS

Walter G. Koupal, Tarentum, Pa., assignor to Pittsburgh Plate Glass Company, a Corporation of Pennsylvania Application November 10, 1932
Serial No. 642,032

4 Claims. (Cl. 49—33)

The invention relates to glass rolling apparatus of the type shown in the Gelstharp Reissue Patent No. 16,856, in which a glass sheet is rolled vertically from a glass bath by means of a pair of sizing rolls having their peripheries submerged in the glass. More particularly the invention relates to improved means used in connection with one of the lip tiles for partially closing the space between the lip tile and the surface of the glass. In apparatus of this kind the fires under the pot are operated under pressure and the only vents possible are around the burner holes and under the leer side lip tile. It is desirable to carry a fairly long fire under the pot and over the end of the pot, but it is not desirable to have the tip of the flame or too much heat pressure strike against the leer roll surface as it may be heated locally and intermittently and as a result the sheet will adhere too tightly to these locally heated spots and cause waves or bumps in the sheet as it is formed. Lowering the lip tile close to the surface of the glass, of course, cuts off this undesirable heat pressure, but a piece of clay of this length warps readily with changes of temperature and as a result the space between the lip tile and glass surface varies across the pot and more heat pressure escapes at some points than others (usually at the ends) and local heating of the leer side roll results.

Figure 5:
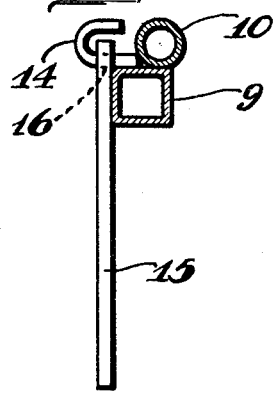
Figure 6:
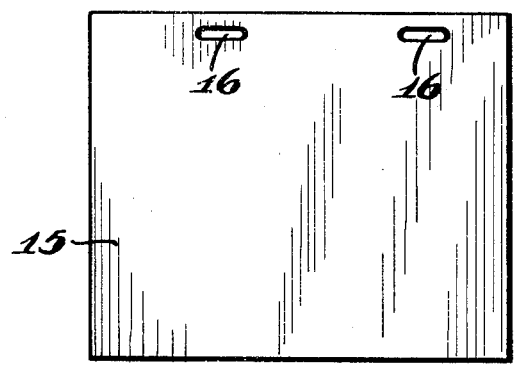

Formerly to close this opening of varying dimensions, a water cooled sheet metal box was suspended above the glass; thus holding back the heat pressure. However, this water cooled shut-off abstracted a very considerable amount of heat from the glass passing under it and as it is difficult to hold up the heat in this end of the pot, this loss of heat was detrimental to the process. Moreover as products of combustion were passing this cooler, condensation was taking place continually causing the cooler to "sweat" and the water to fall on the glass surface. Also considerable fume collects on the cooler which, together with rust, flakes off onto the glass surface, causing defects to appear in the sheet. The object of the invention is to avoid the objections incident to the use of the water cooled box as above described and provide a substitute means in which the cut off means is kept parallel with the surface of the glass, providing a uniform opening for the escape of gases and which will abstract no heat from the glass. One embodiment of the invention is illustrated in the accompanying drawings, wherein:

Figure 1 is a perspective view. Fig. 2 is a section on the line II—II of Fig. 1. Figs. 3 and 4 are detail views of the shielding or cut off means, Fig. 3 being a plan view and Fig. 4 a front elevation. Fig. 5 is a section on the line V—V of Fig. 4. And Fig. 6 is a detail view of one of the shielding plates employed.

Referring to the general arrangement as shown in Figs. 1 and 2, 1 is the draw pot communicating with the melting tank which is not shown; 2, 3 are sizing rolls extending across the draw pot and having their peripheries such that they engage the glass in the draw pot; and 4 and 5 are roof members extending over the draw pot and ordinarily referred to as "lip tile", such tile being supported from above by means of the pipes 6, 7 connected to the tile by means of the strips 8 extending around reinforcing in the lip tile.

A cut off means, to which the invention particularly relates comprises a pair of supporting pipes 9 and 10, the pipe 9 being preferably square in cross section as shown in Fig. 5. The pipes are connected at their right hand ends, as indicated at 11 in Fig. 4, and suitable connections are made to the other ends of the pipe at 12 and 13, whereby a circulation of water is secured through the pipes in order to keep them cooled and prevent warping. The pipe 9 is provided with a plurality of hooks 14 welded to the top of the pipe and serving to support the plates which act as the cut off means. The cut off plates 15, 15, 15, etc. are preferably of heat resisting metal and are provided at their upper ends with the slots 16 through which the hook members 14 extend. This method of support permits of a free endwise movement of the plates to take care of expansion and permits them to be adjusted along the supporting pipe so that their edges come close together and thus form a continuous depending shield. As indicated in Fig. 2, the lower edges of the plates extend down to a level intermediate the lower edge of the lip tile and the surface of the glass. The plates may be proportioned so that their lower edges together constitute a straight line as shown, or of desired they may be proportioned so that the slot between the lower edges of the plates and the glass varies in width.

As heretofore pointed out, the shield as thus provided does not itself chill the glass and the lower edge of the shield does not vary in position with respect to the bath due to heat conditions, since the supporting means comprising the water cooled pipes will not sag or change their position and any warping or change of position due to the contraction and expansion of the plates is negligible. The water cooled pipes 9 and 10 are supported by the screw devices 17, as indicated in Fig. 2, whereby the position of the lower edges of the plates may be adjusted with exactness with respect to the level of the glass bath, it being desirable in most cases to provide a minimum amount of separation between the edges of the plates and the surface of the glass, but without the plates contacting with the glass, as such contact would injure the quality of the glass.

What I claim is:

1. The combination with a draw pot adapted to carry a bath of molten glass with a pair of sizing rolls extending thereacross having their peripheries in the glass and a lip tile above the glass on one side of the rolls, of a cut off means at the front edge of the tile comprising water cooled supporting means extending longitudinally of the lip tile at the front edge thereof, and a series of metal plates supported edge to edge on said means and projecting to a point intermediate the bottom of the tile and the surface of the glass.

2. The combination with a draw pot adapted to carry a bath of molten glass with a pair of sizing rolls extending thereacross having their peripheries in the glass and a lip tile above the glass on one side of the rolls, of a cut off means at the front edge of the tile comprising a water cooled pipe extending along the upper edge of the lip tile, and a series of metal plates supported at their upper edges upon said pipe along the front edge of the lip tile, and having their lower edges lying at a level intermediate the bottom of the tile and the surface of the glass.

3. The combination with a draw pot adapted to carry a bath of molten glass with a pair of sizing rolls extending thereacross having their peripheries in the glass and a lip tile above the glass on one side of the rolls, of a cut off means at the front edge of the tile comprising a water cooled pipe extending along the upper edge of the lip tile, and provided with a series of supporting hook members, and a series of metal plates perforated at their upper edges to receive the hook members and having their lower edges lying at a level intermediate the bottom of the tile and the surface of the glass.

4. The combination with a draw pot adapted to carry a bath of molten glass with a pair of sizing rolls extending thereacross having their peripheries in the glass and a lip tile above the glass on one side of the rolls, of a cut off means at the front edge of the tile comprising a water cooled pipe extending along the upper edge of the lip tile, and provided with a series of supporting hook members, and a series of metal plates slotted along their upper edges with said hook members extending therethrough and having their lower edges lying at a level intermediate the bottom of the tile and the surface of the glass.

WALTER G. KOUPAL.